(12) United States Patent
Luthra et al.

(10) Patent No.: US 11,479,515 B2
(45) Date of Patent: Oct. 25, 2022

(54) EBC WITH MULLITE BONDCOAT THAT INCLUDES AN OXYGEN GETTER PHASE

(71) Applicant: General Electric Company, Schenectady, NY (US)

(72) Inventors: Krishan Lal Luthra, Schenectady, NY (US); Julin Wan, Rexford, NY (US)

(73) Assignee: General Electric Company, Schenectady, NY (US)

( * ) Notice: Subject to any disclaimer, the term of this patent is extended or adjusted under 35 U.S.C. 154(b) by 910 days.

(21) Appl. No.: 16/229,429

(22) Filed: Dec. 21, 2018

(65) Prior Publication Data

US 2020/0199031 A1 Jun. 25, 2020

(51) Int. Cl.
| | |
|---|---|
| C04B 41/89 | (2006.01) |
| C04B 41/00 | (2006.01) |
| C04B 41/50 | (2006.01) |
| C04B 41/52 | (2006.01) |
| C04B 41/87 | (2006.01) |

(52) U.S. Cl.
CPC ............ *C04B 41/89* (2013.01); *C04B 41/009* (2013.01); *C04B 41/5031* (2013.01); *C04B 41/52* (2013.01); *C04B 41/87* (2013.01); *F05D 2300/6033* (2013.01)

(58) Field of Classification Search
CPC ...... C04B 41/5031; C04B 41/52; C04B 41/87
USPC .................................................. 428/701, 702
See application file for complete search history.

(56) References Cited

U.S. PATENT DOCUMENTS

| | | | |
|---|---|---|---|
| 6,607,852 B2 | 8/2003 | Spitsberg et al. | |
| 6,929,852 B2 | 8/2005 | Lane et al. | |
| 7,300,702 B2 | 11/2007 | Li et al. | |
| 8,455,103 B2 | 6/2013 | Louchet-Pouillerie et al. | |
| 8,658,255 B2 | 2/2014 | Kirby et al. | |
| 9,713,912 B2 | 7/2017 | Lee | |
| 9,969,655 B2 | 5/2018 | Wan et al. | |
| 10,822,998 B2 | 11/2020 | Luthra et al. | |
| 2002/0025454 A1 | 2/2002 | Wang et al. | |
| 2009/0324930 A1* | 12/2009 | Tulyani .................. | F01D 5/288 428/317.1 |
| 2011/0027557 A1 | 2/2011 | Kirby et al. | |
| 2014/0272168 A1 | 9/2014 | Lee | |

(Continued)

FOREIGN PATENT DOCUMENTS

WO WO2017/031163 A1 2/2017

OTHER PUBLICATIONS

Hu et al., Water Vapor Corrosion Behavior and Failure Mechanism of Plasma Sprayed Mullite/Lu2Si2O7—Lu2SiO5 Coatings, Science Direct, Ceramics International, Conference—China, Aug. 15, 2018, vol. 44, Issue 12, pp. 14177-14185. (Abstract Only) https://doi.org/10.1016/j.ceramint.2018.05.020.

(Continued)

*Primary Examiner* — Archene A Turner
(74) *Attorney, Agent, or Firm* — Dority & Manning, P.A.

(57) ABSTRACT

A coated component, along with methods of its formation and use, is provided. The coated component includes a ceramic matrix composite (CMC) substrate comprising silicon carbide and having a mullite bondcoat on its surface. The mullite bondcoat includes an oxygen getter phase contained within a mullite phase. For example, the mullite bondcoat may include 60% to 98% by volume of the mullite phase. An environmental barrier coating is on the mullite bondcoat.

20 Claims, 5 Drawing Sheets

(56) References Cited

U.S. PATENT DOCUMENTS

| | | | |
|---|---|---|---|
| 2015/0079371 A1* | 3/2015 | Nakada | C04B 35/58085 |
| | | | 428/448 |
| 2016/0376691 A1 | 12/2016 | Wadley et al. | |
| 2017/0073277 A1* | 3/2017 | Shim | F01D 5/288 |
| 2019/0370862 A1* | 12/2019 | Seo | G09F 25/00 |
| 2020/0199032 A1* | 6/2020 | Luthra | C04B 41/4582 |

OTHER PUBLICATIONS

Zhu et al., Thermal Conductivity of Ceramic Thermal Barrier and Environmental Barrier Coating Materials, NASA Technical Reports Server, NASA/TM-2001-211122, Sep. 1, 2001, 20 Pages.
U.S. Appl. No. 15/697,895, filed Sep. 7, 2017.
U.S. Appl. No. 15/697,913, filed Sep. 7, 2017.
U.S. Appl. No. 15/697,947, filed Sep. 7, 2017.
European Search Report Corresponding to Application No. 19215639 dated Apr. 16, 2020.

* cited by examiner

EBC WITH MULLITE BONDCOAT THAT INCLUDES AN OXYGEN GETTER PHASE

FIELD

The present invention generally relates to bondcoats for use with environmental barrier coatings on ceramic components, particularly silicon-based ceramic matrix components, along with methods of their formation and use.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from super alloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials, in particular silicon carbide (SiC) fiber reinforced SiC and SiC—Si matrix composites, so called SiC/SiC composites. CMC and monolithic ceramic components can be coated with environmental barrier coatings (EBCs) to protect them from the harsh environment of high temperature engine sections. EBCs can provide a dense, hermetic seal against the corrosive gases in the hot combustion environment.

Silicon carbide and silicon nitride ceramics undergo oxidation in dry, high temperature environments. This oxidation produces a passive, silicon oxide scale on the surface of the material. In moist, high temperature environments containing water vapor, such as a turbine engine, both oxidation and recession occurs due to the formation of a passive silicon oxide scale and subsequent conversion of the silicon oxide to gaseous silicon hydroxide. To prevent recession in moist, high temperature environments, environmental barrier coatings (EBC's) are deposited onto silicon carbide and silicon nitride materials.

Currently, EBC materials are made out of rare earth silicate compounds. These materials seal out water vapor, preventing it from reaching the silicon oxide scale on the silicon carbide or silicon nitride surface, thereby preventing recession. Such materials cannot prevent oxygen penetration, however, which results in oxidation of the underlying substrate. Oxidation of the substrate yields a passive silicon oxide scale, along with the release of carbonaceous or nitrous oxide gas. The carbonaceous (i.e., $CO$, $CO_2$) or nitrous (i.e., $NO$, $NO_2$, etc.) oxide gases cannot escape out through the dense EBC and thus, blisters form, which can cause spallation of the EBC. The use of a silicon bondcoat has been the solution to this blistering problem to date. The silicon bondcoat provides a layer that oxidizes (forming a passive silicon oxide layer beneath the EBC) without liberating a gaseous by-product.

However, the presence of a silicon bondcoat limits the upper temperature of operation for the EBC because the melting point of silicon metal is relatively low. In use, the silicon bondcoat melts at coating temperatures of about 1414° C., which is the melting point of silicon metal. Above these melting temperatures, the silicon bondcoat may delaminate from the underlying substrate, effectively removing the bondcoat and the EBC thereon. As such, it is desirable to have improved bondcoats in the EBC to achieve a higher operational temperature limit for the EBC.

BRIEF DESCRIPTION

Aspects and advantages of the invention will be set forth in part in the following description, or may be obvious from the description, or may be learned through practice of the invention.

A coated component is generally provided, along with methods of its formation and use. In one embodiment, the coated component includes a ceramic matrix composite (CMC) substrate comprising silicon carbide and having a mullite bondcoat on its surface. The mullite bondcoat includes an oxygen getter phase contained within a mullite phase. For example, the mullite bondcoat may include 60% to 98% by volume of the mullite phase (e.g., 65% to 96% by volume of the mullite phase, such as 75% to 95% by volume of the mullite phase). An environmental barrier coating is on the mullite bondcoat.

In certain embodiments, the mullite phase includes alumina and silica in a stoichiometric ratio within 10% of 3 to 2, such as about 3 to 2 up to about 3.5 to 2. In other embodiments, the mullite phase includes alumina and silica in a stoichiometric ratio within 10% of 2 to 1, such as about 2 to 1 up to about 2.25 to 1. In particular embodiments, the mullite phase may consists of alumina and silica.

In certain embodiments, the oxygen getter phase comprises a silicon phase (e.g., elemental silicon). For example, the mullite bondcoat may include 2% to 40% by volume elemental silicon.

The environmental barrier coating may include one or more layers of hafnia, alumina, a rare earth disilicate, a rare earth monosilicate, or both.

In one embodiment, a method is provided for forming a coated component. For example, the method may include forming a mullite bondcoat on a surface of a substrate and forming an environmental barrier coating on the mullite bondcoat. The mullite bondcoat comprises a silicon-phase contained within a mullite phase, with the mullite bondcoat comprises 60% to 95% by volume of the mullite phase. The silicon-phase, when melted, is contained within mullite phase between the surface of the substrate and an inner surface of the environmental barrier coating.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
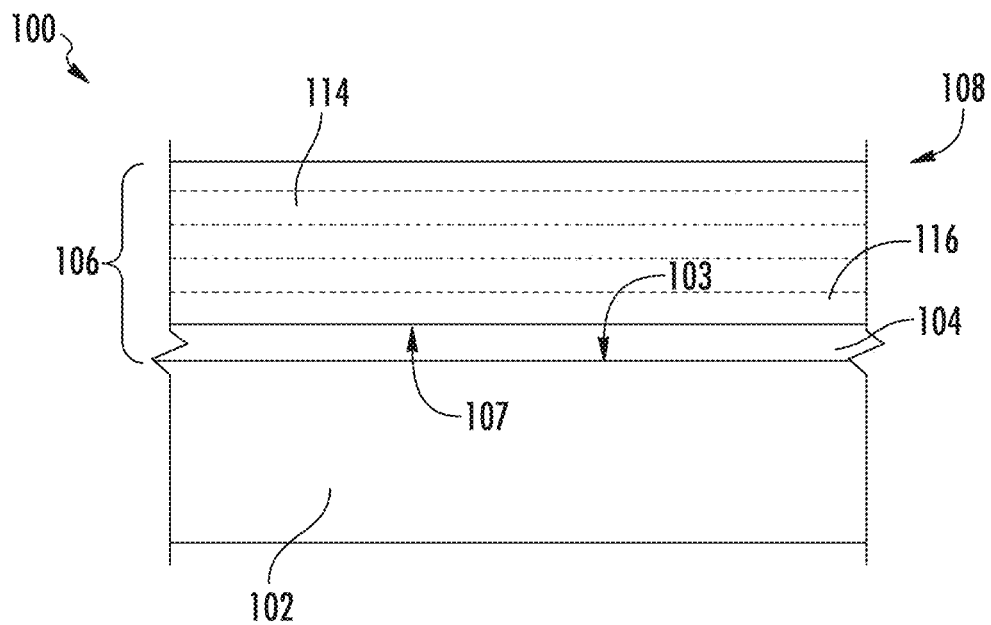
FIG. 1 is a cross-sectional side view of an exemplary coated component including a mullite bondcoat including silicon.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. As used herein, "RE" refers to a rare earth element or a mixture of rare earth elements. More specifically, the "RE" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

As used herein, the term "substantially free" means no more than an insignificant trace amount present and encompasses completely free (e.g., 0 molar % up to 0.01 molar %).

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

A coated component is generally provided that includes a mullite bondcoat having an oxygen getter phase (e.g., a silicon-phase) contained therein. The mullite bondcoat including the oxygen getter phase is generally positioned between the surface of the substrate and an environmental barrier coating (EBC) thereon.

In particular embodiments, the oxygen getter within the oxygen getter phase may have minimal thermal expansion coefficient mismatch with the substrate and mullite (e.g., no more than about 2-3 ppm per ° C.) to avoid matrix cracks. However, those skilled in the art know that a larger expansion coefficient mismatch can be accommodated by reducing the volume fraction of the getter phase. In another particular embodiment, the oxygen getter should have minimal volume increase on oxidation (e.g., no more than 150%, preferably no more than 100%, and more preferably a volume reduction on oxidation rather than a volume expansion) to reduce the stresses in the mullite layer and its cracking. Many embodiments of the oxygen getter phase are possible that satisfy that satisfy the requirements for the expansion coefficient mismatch and the volume change on oxidation. In one embodiment the getter is pure silicon. In another embodiment, it is a silicon alloy or a silicide. In the embodiment where the oxygen getter phase includes a silicon-phase (e.g., elemental silicon), then the mullite bondcoat may be referred to as a "mullite/Si bondcoat." Silicon oxidation causes a volume expansion of about 115% to about 130% when it forms amorphous silica and a volume expansion of about 85% when it forms crystalline silica. However, the oxidation product is invariably amorphous first, which can then become crystalline with time.

Other embodiments of oxygen getters may include, but are not limited to, nickel, cobalt, chromium, or mixtures thereof. These oxygen getters may also be used in particular embodiments with silicon, a silicon alloy, and/or a silicide. For example, nickel has a much higher expansion mismatch (almost 8 ppm per ° C.) with the substrate and mullite. Therefore, the maximum volume fraction of nickel that can be tolerated would be lower than that of silicon which has a mismatch of less than 1 ppm per ° C. However, nickel has a volume expansion on oxidation of about 65% compared to about 115% to about 130% for silicon converting to amorphous silica. Chromium, on the other hand, has a lower expansion mismatch with the substrate and mullite than does nickel. It also has a higher melting temperature (1907° C.) compared to silicon (1410° C.) and nickel (1455° C.).

In one particular embodiment, the mullite bondcoat is formed from elemental silicon (as the silicon-phase) contained within a mullite phase. As explained in greater detail below, the elemental silicon within the mullite may melt during operation of the coated component, while remaining contained within the mullite phase and while keeping the functions of the bondcoat. Such functions of the mullite bondcoat may include, but are not limited to, bonding the substrate to the EBC thereon and gettering of oxygen without releasing gas to prevent oxidation of the underlying substrate that would otherwise result in a gaseous by-product. Thus, a liquid silicon-phase may be utilized within the mullite bondcoat during operation of the coating component (e.g., within a gas turbine engine). Since the mullite bondcoat continues to function above the melting point of the silicon-phase, the coated component can be operated at temperatures above the melting point of the silicon-phase.

Although silicon does not oxidize to form a gas like CO from SiC, it does form silicon hydroxides gaseous species.

However, the partial pressures of the silicon hydroxides gaseous species are so low that they do not form gas bubbles. Moreover, these partial pressures do not lead to recession unless there are interconnected pores to the outside gas surface. Therefore, it is desirable to have minimum porosity with little or no interconnected pores to the outside.

Referring to FIG. 1, an exemplary coated component 100 is shown formed from a substrate 102 having a surface 103 with a coating system 106 thereon. The substrate 102 is formed from a ceramic matrix composite ("CMC") material, such as a silicon based, non-oxide ceramic matrix composite. As used herein, "CMC" refers to a silicon-containing matrix and reinforcing material. As used herein, "monolithic ceramics" refers to materials without fiber reinforcement (e.g., having the matrix material only). Herein, CMCs and monolithic ceramics are collectively referred to as "ceramics." In particular embodiments, the CMC substrate 102 includes silicon carbide (SiC) within its ceramic matrix and fibers (when present).

Generally, the coating system 106 includes a mullite bondcoat 104 on the surface 103 of the substrate, and an EBC 108 on the mullite bondcoat 104. In the embodiment shown, the mullite bondcoat 104 is directly on the surface 103 without any layer therebetween.

Figure 2:
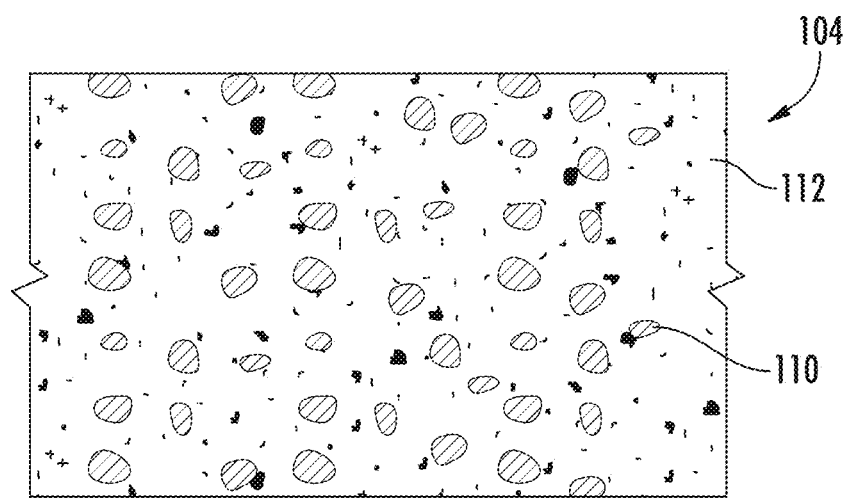
FIG. 2 is a cross-sectional side view of an exemplary mullite bondcoat including silicon having with a continuous mullite phase with discrete silicon-phases dispersed therein.

In the exemplary embodiment of FIG. 2, the mullite bondcoat 104 has a continuous mullite phase 112 with discrete silicon-phases 110 dispersed therein. Although shown as discrete silicon-phases 110, some continuity of the silicon-phase is acceptable as long as the liquid silicon does not lead to spallation of the coating. No matter the configuration of the mullite bondcoat 104, the silicon-phase 110 is contained, upon melting, within the mullite phase 112 between the surface 103 of the substrate 102 and an inner surface 107 of the environmental barrier coating 108. That is, the mullite phase 112 may form a 3-dimensional network that spans the thickness of the mullite bondcoat 104 and is bonded to the surface 103 of the substrate 102 and to the inner surface 107 of the environmental barrier coating 108. As such, the mullite phase 112 works with the surface 103 of the substrate 102 and the environmental barrier coating 108 to contain the melted silicon-phase therein while keeping the integrity of the mullite bondcoat 104 without delamination from the surface 103 of the substrate 102.

Mullite generally has a relatively slow diffusion rate for oxygen at all temperatures of interest, even up to about 1650° C. (e.g., about 1200° C. to about 1650° C.). At temperatures over about 1200° C., it is believed that the only other crystalline oxide that has lower oxygen diffusion rate than mullite is alumina, which has a very high expansion coefficient compared to the substrate and cannot be deposited as dense coatings without spallation. Although mullite has a coefficient of thermal expansion ("CTE") that is similar to that of SiC CMC substrates 102, the CTE of mullite is not an exact match to SiC. The slight mismatch of CTE of mullite and SiC could lead to problems related to thermal expansion, such as cracking and/or delamination, if the mullite bondcoat 104 is too thick. For example, it is believed that a mullite bondcoat 104 having a thickness of 20 mils (i.e., 508 μm) would lead to problems related to the CTE mismatch after repeated exposure to the operating temperatures. On the other hand, it is believed that a mullite bondcoat 104 having a maximum thickness of 10 mils or less, such as 1 mil to 10 mils (i.e., 254 μm or less, such as 25.4 μm to 254 μm), would survive such operating temperatures without significant problems from the CTE mismatch. In one particular embodiment, the mullite bondcoat 104 has a maximum thickness of 5 mils, such as 3 mils to 5 mils (i.e., 127 μm, such as 76.2 μm to 127 μm).

The mullite phase 112 is included in the mullite bondcoat 104 in an amount to provide structural integrity to the mullite bondcoat 104 while the silicon-phase 110 is melted at operating temperatures above the melting point of elemental silicon (i.e., about 1414° C.). As such, at least 60% of the mullite bondcoat 104 may be mullite. In particular embodiments, the mullite bondcoat 104 may include 60% to 98% by volume mullite, such as 65% to 96% by volume mullite (e.g., 75% to 95% by volume mullite).

Conversely, the silicon-phase 110 is included in the mullite bondcoat 104 in an amount sufficient to serve as oxygen getter. In one particular embodiment, the silicon-phase 110 may be formed from silicon metal (i.e., elemental silicon), a silicon alloy (e.g., a silicon eutectic alloy), a silicide with a melting point of about 1500° C. or less, or mixtures thereof. As such, the silicon-phase 110 may melt at temperatures of about 1400° C. to about 1500° C., depending on the composition of the silicon-phase 110, so as to become molten. For example, the silicon-phase 110 may have at a melting temperature of about 1414° C. (i.e., the melting point of elemental silicon) to about 1485° C. In particular embodiments, the silicon-phase 110 may be formed from a silicon material that is molten at a bondcoat temperature of 1415° C., 1425° C., 1450° C., 1475° C., and/or 1500° C.

For example, the mullite bondcoat 104 may, in certain embodiments, include 2% to 40% by volume of the silicon-phase 110, such as 4% to 35% by volume of the silicon-phase 110 (e.g., 5% to 25% by volume of the silicon-phase 110). In particular embodiments, for example, the silicon-phase 110 may include 5% to 40% by volume of elemental silicon, such as about 7% to 35% by weight of elemental silicon (e.g., 5% to 25% by volume of elemental silicon). Elemental silicon has a melting point of about 1414° C. As used herein, "elemental silicon" refers to silicon without any alloying materials present, outside of incidental impurities.

In certain embodiments, a silicide having a melting point of about 1500° C. or less (e.g., about 1400° C. to about 1500° C.) may also be in the silicon-phase 110. Determining the melting point of a particular silicide may be easily achieved using Si phase diagrams.

In particular embodiments, the mullite phase 112 is formed from crystallized mullite having a melting temperature that is greater than the silicon-phase 110. In particular embodiments, the mullite has a melting temperature that is about 1825° C. to 1860° C. (e.g., about 1840° C.), and is generally unreactive with the silicon material of the silicon-phase 110 (e.g., elemental silicon).

Mullite is a chemical compound of alumina and silica with an alumina ($Al_2O_3$) and Silica ($SiO_2$) ratio of about 3 to 2 (e.g., within 10 mole % of 3 to 2 of alumina to silica). A ratio of about 2 to 1 has also been reported (e.g., within 10 mole % of 2 to 1 of alumina to silica). In one embodiment, the mullite layer may contain excess of alumina, up to about 10 mole % of excess alumina. For example, the mullite phase may include alumina and silica in a stoichiometric ratio of about 3 to 2 up to about 3.5 to 2 or in a stoichiometric ratio of about 2 to 1 up to about 2.25 to 1. In another embodiment, the mullite layer may contain excess of silica. If there is excess silica, it should preferably be not continuous. As used here, "alumina" refers to aluminum oxide in the form of $Al_2O_3$. As used here, "silica" refers to silicon oxide in the form of $SiO_2$.

In one embodiment, a thermally grown oxide ("TGO") layer may form directly on the outer surface of the Si phase within the bondcoat 104, such as a layer of silicon oxide (sometimes referred to as "silicon oxide scale" or "silica scale"), during exposure to oxygen (e.g., during manufacturing and/or use) of the component 100.

As stated above, the substrate 102 may be formed from a CMC material, such as a silicon based, non-oxide ceramic matrix composite. Some examples of CMCs acceptable for use herein can include, but are not limited to, materials having a matrix comprising non-oxide silicon-based materials such as silicon carbide, silicon nitride, silicon oxycarbides, silicon oxynitrides, and mixtures thereof. Some examples of CMCs acceptable for use herein can include, but are not limited to, materials having reinforcing fibers comprising carbon fibers and/or non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; Si—SiC matrix and silicon carbide fibers, silicon carbide matrix and carbon fiber; silicon nitride matrix and silicon carbide fiber; and silicon carbide/silicon nitride matrix mixture and silicon carbide fiber.

As stated above, the mullite bondcoat 104 may be used in conjunction with an EBC 108 to form a coated component 100 with an increased operating temperature compared to that using only a silicon bondcoat (without the mullite phase). The EBC 108 may include any combination of one or more layers formed from materials selected from typical EBC or thermal barrier coating ("TBC") layer chemistries, including but not limited to rare earth silicates (e.g., monosilicates and di-silicates), aluminosilicates (e.g., mullite, barium strontium aluminosilicate (BSAS), rare earth aluminosilicates, etc.), hafnia, zirconia, stabilized hafnia, stabilized zirconia, rare earth hafnates, rare earth zirconates, rare earth gallium oxide, etc.

The EBC 108 may be formed from a plurality of individual layers 114. In the embodiments shown, EBC 108 includes a hermetic layer 116 positioned in directly on the mullite bondcoat 104 so as to encase the silicon phase 110, upon melting, within the mullite bondcoat 104. In one embodiment, this hermetic layer is of mullite, up to 2 mil thick, such as preferably about 0.1 mil to about 1 mil thick (e.g., about 0.1 mil to about 0.5 mil thick). Since the silicon-phase 110 is reactive with oxygen to form silicon oxide, there is minimal gaseous oxides produced (e.g., carbon oxides) upon exposure of the component 100 to oxygen at operating temperatures. Thus, there is no need for a gas escape layer through the mullite bondcoat 104, and the hermetic layer may be included within the EBC 108. It is even desirable to have a hermetic layer to prevent the ingress of water vapor to the bond coat. In one embodiment, the hermetic layer 116 may be positioned directly on the mullite bondcoat 104, but may also be positioned elsewhere within the EBC 108.

The coated component 100 is particularly suitable for use as a component found in high temperature environments, such as those present in gas turbine engines, for example, combustor components, turbine blades, shrouds, nozzles, heat shields, and vanes. In particular, the turbine component can be a CMC component 100 positioned within a hot gas flow path of the gas turbine such that the coating system 106 forms an environmental barrier for the underlying substrate 102 to protect the component 100 within the gas turbine when exposed to the hot gas flow path. In certain embodiments, the mullite bondcoat 104 is configured such that the coated component 100 is exposed to operating temperatures of about 1475° C. to about 1650° C.

Figure 3:
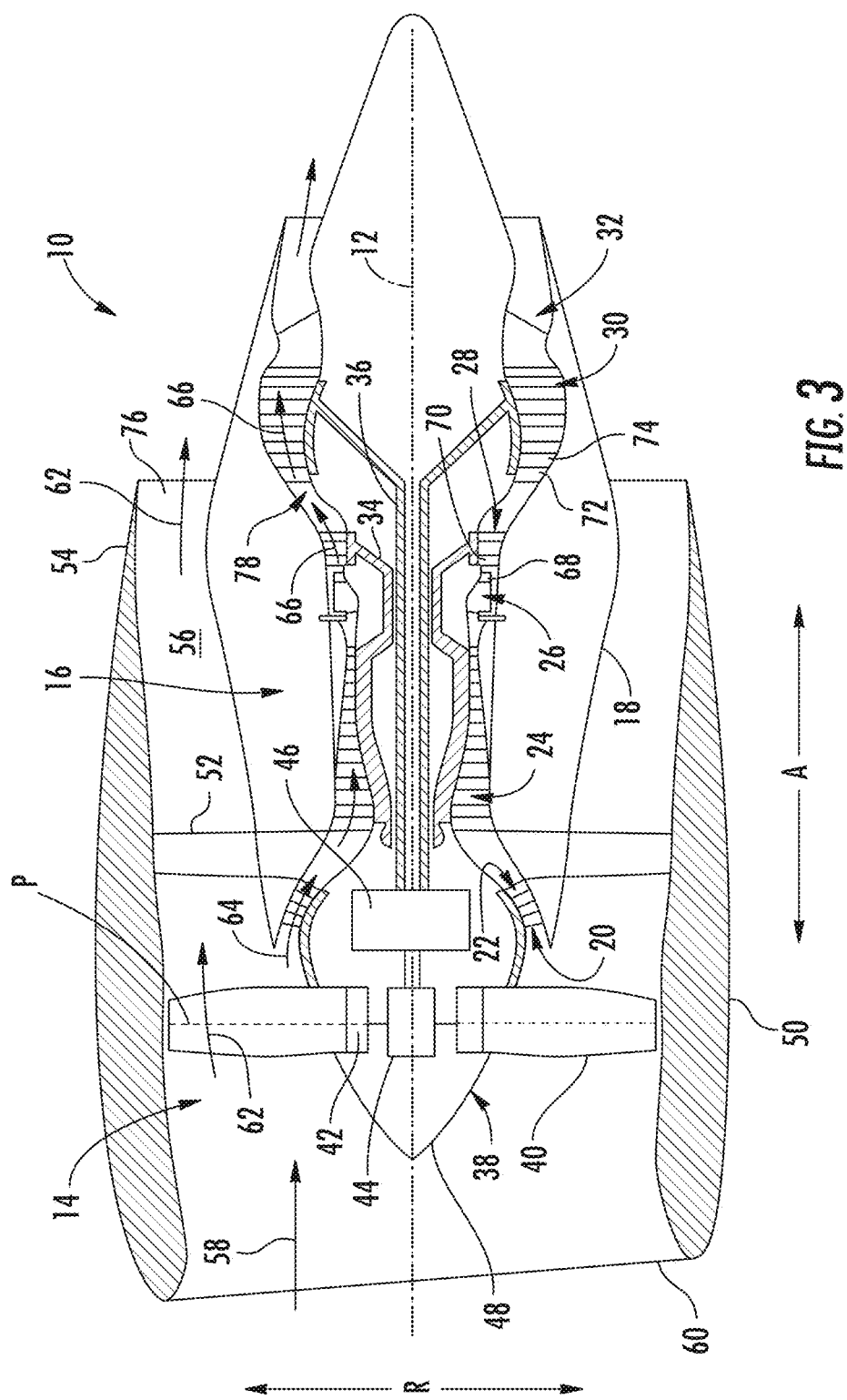
FIG. 3 is a schematic cross-sectional view of an exemplary gas turbine engine according to various embodiments of the present subject matter.

FIG. 3 is a schematic cross-sectional view of a gas turbine engine in accordance with an exemplary embodiment of the present disclosure. More particularly, for the embodiment of FIG. 3, the gas turbine engine is a high-bypass turbofan jet engine 10, referred to herein as "turbofan engine 10." As shown in FIG. 3, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14. Although described below with reference to a turbofan engine 10, the present disclosure is applicable to turbomachinery in general, including turbojet, turboprop and turboshaft gas turbine engines, including industrial and marine gas turbine engines and auxiliary power units. It is also applicable to other high temperature applications that contain water vapor in the gas phase, such as those arising from combustion of hydrocarbon fuels.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 3, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 4:
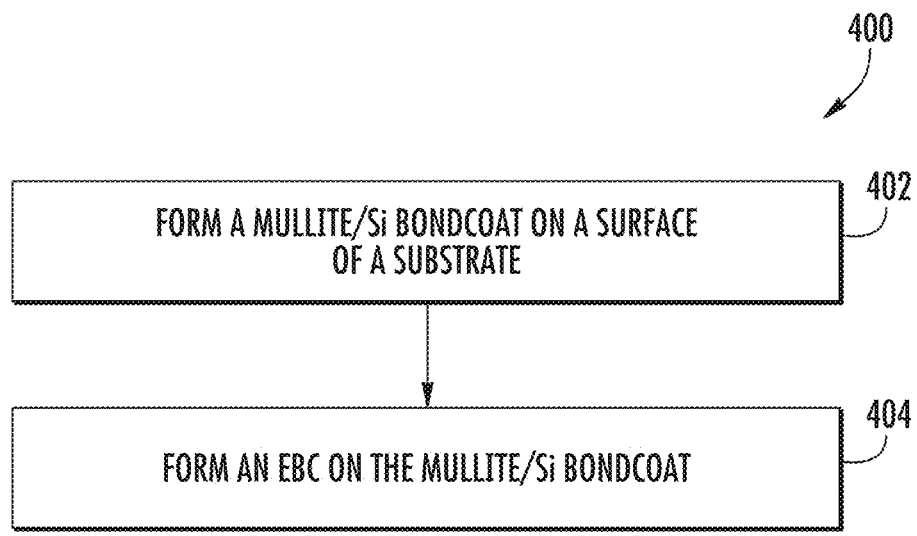
FIG. 4 is a diagram of an exemplary method of forming a mullite bondcoat including silicon.

Methods are also generally provided for coating a ceramic component. For example, FIG. 4 shows a diagram of an exemplary method 400 of forming a coating system on a surface of a substrate. At 402, a mullite bondcoat is formed on the surface of the substrate to include a silicon-phase contained within a mullite phase, such as described above with respect to mullite bondcoat 104.

In one embodiment, the mullite bondcoat is formed by air plasma spray. In another embodiment, it is formed by suspension plasma spray where a liquid suspension of the desired chemistry is used for air plasma spray. In still another embodiment, the coating is formed by low pressure plasma spray. In yet another embodiment one or more of the coated layers may be formed by a slurry coating process followed by sintering of the layer. Different coating layers may be formed by one or more of these processes.

At 404, an environmental barrier coating (EBC) is formed on the mullite bondcoat. As described above, the silicon-phase, when melted, is contained within mullite phase between the surface of the substrate and an inner surface of the environmental barrier coating.

Examples

Figure 5:
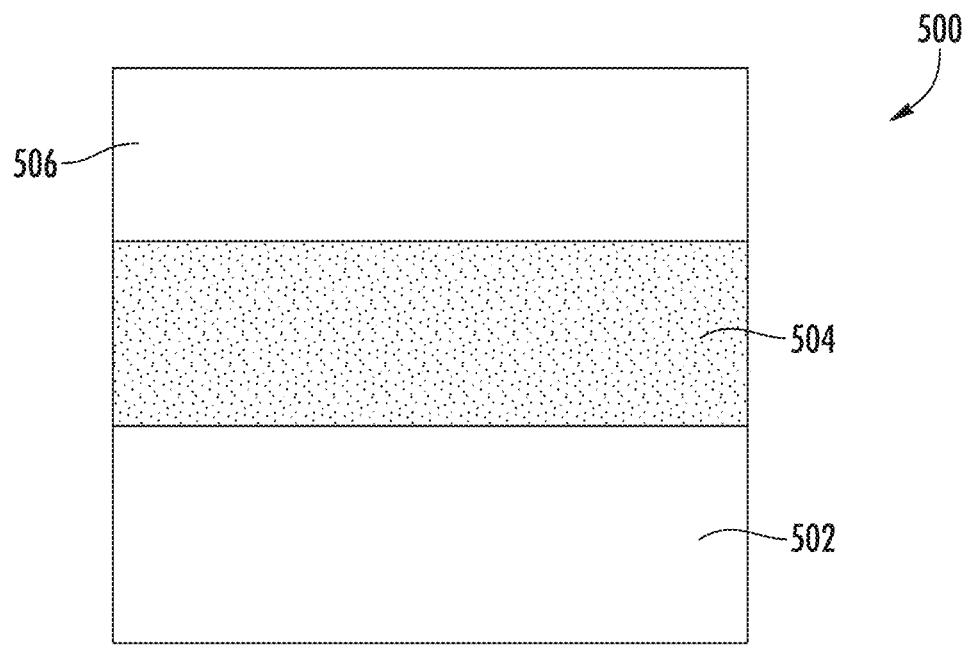
FIG. 5 shows a schematic diagram of an exemplary coated component formed according to the examples.

FIG. 5 shows a schematic of a coating system 500 on a substrate 502, where the coating system 500 is composed of a bond coat 504 which is a biphasic structure of mullite and silicon, and a dense outer layer 506. In this bond coat 504, silicon is the oxygen getter, it oxidizes to form silica. Neither the silicon phase or the silica oxidation product phase needs to be continuous in this embodiment. At the service temperature, the silicon phase may be a liquid. The outer layer may contain several sublayers of oxides.

Figure 6:
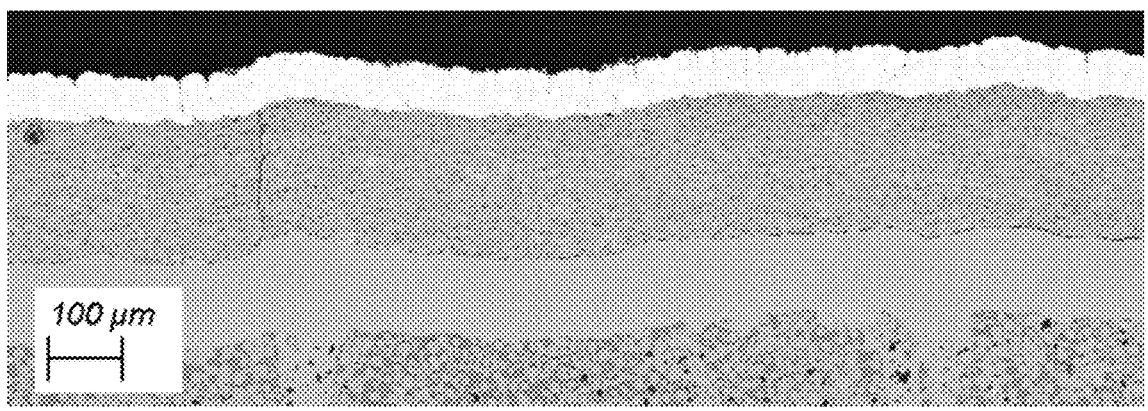
FIG. 6 shows a cross section of an exemplary coated component made according to the Examples and having a bond coat of mullite and Si, capped by an EBPVD hafnia outer layer.

FIG. 6 shows an exemplary coating formed according to the architecture shown in FIG. 5. The mullite-Si bond coat was applied by slurry plasma spray and the outer layer is applied by electron beam physical vapor deposition (EBPVD) and was formed from hafnia. In this embodiment, the outer layer, although is of substantially higher density than the columnar structure produced by slurry plasma spray, still maintains a columnar structure thus not completely dense. An outer layer of this structure is designed for improved erosion resistance while maintaining some resistance to thermal stress that arises from CTE mismatch.

Figure 7A:
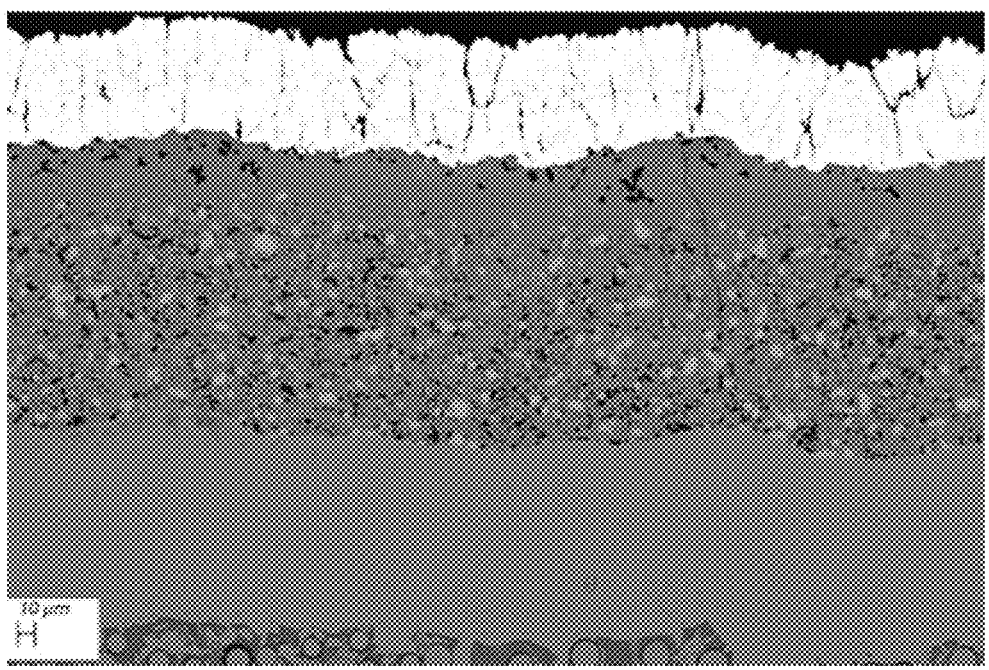
FIG. 7A shows a cross section of the exemplary coated component of FIG. 6 after a cyclic steam test at 2700° F. for 100 hours according to the examples.

The coating shown in FIG. 6 was subjected to cyclic steam test at 2700° F. (about 1482° C.). The samples survived testing for 500 hours to 1000 hours without spallation. The bond coat showed improved oxidation resistance as shown in FIGS. 7A (after 100 hours) and 7B (after 500 hours). The coating also had excellent erosion resistance. It survived 5 times the cycles in hot gas erosion test compared to a similar sample with slurry plasma sprayed alumina top coat instead of an EB-PVD $HfO_2$ top coat.

Figure 7B:
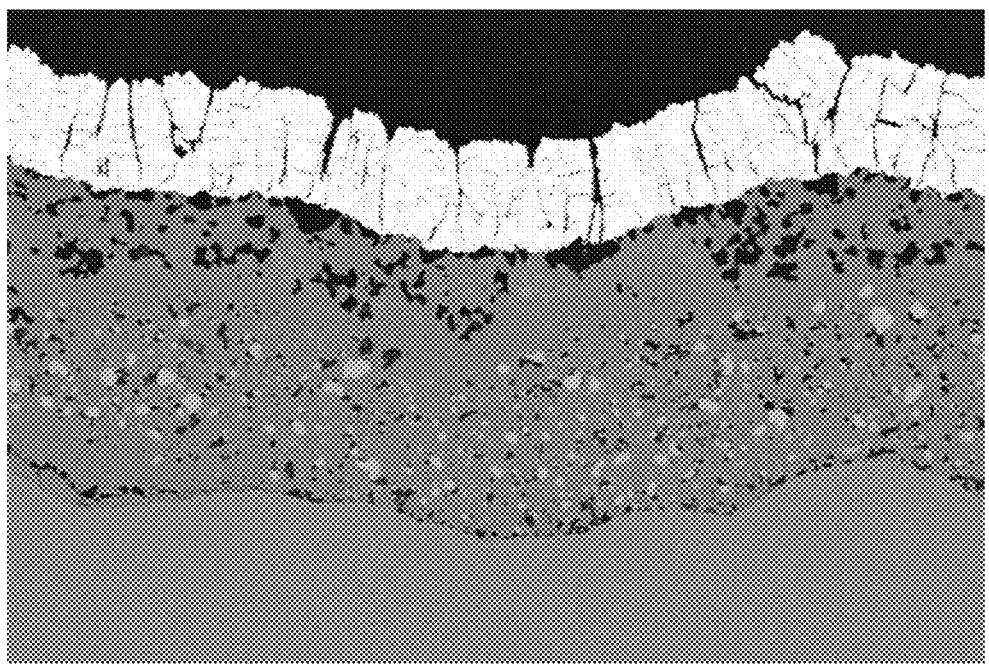
FIG. 7B shows a cross section of the exemplary coated component of FIG. 6 after a cyclic steam test at 2700° F. for 500 hours according to the examples.

Samples in FIGS. 6 and 7 had a coating architecture of mullite-Si/$HfO_2$. Other examples of coating systems with a mullite-Si bond coat layer are: Mullite-Si/$Al_2O_3$/$HfO_2$, Mullite-Si/REDS (Rare Earth Di Silicate)/REMS (Rare Earth Mono Silicate), Mullite-Si/$HfO_2$/REDS/REMS, Mullite-Si/$HfSiO_4$/REDS/REMS, and Mullite-Si/$Al_2O_3$/REDS/REMS. The structures involving Rare Earths (RE) may or may not have the outer layer of the rare earth mono silicate. Some specific rare earth metals of interest are ytterbium and lutetium.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component comprising:
   a ceramic matrix composite (CMC) substrate comprising silicon carbide and having a surface;
   a mullite bondcoat on the surface of the substrate, wherein the mullite bondcoat comprises an oxygen getter phase contained within a mullite phase, wherein the mullite phase is a continuous phase, and wherein the oxygen getter phase forms a plurality of discrete phases within the mullite phase, wherein the mullite bondcoat has a thickness of 10 mils or less, and wherein the mullite bondcoat comprises 60% to 98% by volume of the mullite phase; and
   an environmental barrier coating on the mullite bondcoat.

2. The coated component as in claim 1, wherein the mullite bondcoat comprises 65% to 96% by volume of the mullite phase.

3. The coated component as in claim 1, wherein the mullite bondcoat comprises 75% to 95% by volume of the mullite phase.

4. The coated component as in claim 1, wherein the mullite phase comprises alumina and silica in a stoichiometric ratio within 10% of 3 to 2.

5. The coated component as in claim 1, wherein the mullite phase comprises alumina and silica in a stoichiometric ratio within 10% of 2 to 1.

6. The coated component as in claim 1, wherein the mullite phase consists of alumina and silica.

7. The coated component as in claim 1, wherein the mullite phase comprises alumina and silica in a stoichiometric ratio of at least 3 to 2 and up to 3.5 to 2.

8. The coated component as in claim 1, wherein the mullite phase comprises alumina and silica in a stoichiometric ratio of at least 2 to 1 and up to 2.25 to 1.

9. The coated component as in claim 1, wherein the oxygen getter phase comprises a silicon-phase.

10. The coated component as in claim 9, wherein the silicon-phase comprises elemental silicon.

11. The coated component as in claim 10, wherein the mullite bondcoat comprises 2% to 40% by volume elemental silicon.

12. The coated component as in claim 1, wherein the oxygen getter phase forms a plurality of discrete particulate phases within the mullite phase.

13. The coated component as in claim 1, wherein the mullite phase spans a thickness of the mullite bondcoat and is bonded directly to the surface of the substrate and to an inner surface of the environmental barrier coating.

14. The coated component as in claim 1, wherein the environmental barrier coating comprises a plurality of layers with at least one of the layers of the environmental barrier coating comprises a hermetic layer.

15. The coated component of claim 14, wherein the hermetic layer is adjacent to the mullite bondcoat such that the hermetic layer defines an inner surface of the environmental barrier coating.

16. The coated component as in claim 1, wherein the mullite bondcoat is configured to withstand exposure to operating temperatures of about 1475° C. to about 1650° C.

17. The coated component as in claim 1, wherein the oxygen getter phase comprises elemental silicon, and wherein the environmental barrier coating comprises a hafnia layer, an alumina layer, or both.

18. The coated component as in claim 1, wherein the oxygen getter phase comprises elemental silicon, and wherein the environmental barrier coating comprises a rare earth disilicate layer, a rare earth monosilicate layer, or both.

19. The coated component as in claim 18, wherein the environmental barrier coating further comprises a hafnia layer.

20. A method of forming a coated component, the method comprising:

forming a mullite bondcoat on a surface of a substrate, wherein the mullite bondcoat comprises a silicon-phase contained within a mullite phase, wherein the mullite phase is a continuous phase, and wherein the silicon-phase forms a plurality of discrete phases within the mullite phase, wherein the mullite bondcoat has a thickness of 10 mils or less, and wherein the mullite bondcoat comprises 60% to 95% by volume of the mullite phase; and forming an environmental barrier coating on the mullite bondcoat such that the silicon-phase, when melted, is contained within mullite phase between the surface of the substrate and an inner surface of the environmental barrier coating.

* * * * *